United States Patent
Choi et al.

(10) Patent No.: US 9,344,689 B2
(45) Date of Patent: May 17, 2016

(54) CAMERA SYSTEM WITH MULTI-SPECTRAL FILTER ARRAY AND IMAGE PROCESSING METHOD THEREOF

(71) Applicants: Industry-Academic Cooperation Foundation, Yonsei University, Seoul (KR); Hanwha Techwin Co., Ltd., Changwon-Si (KR)

(72) Inventors: Eun-Cheol Choi, Changwon (KR); Moon-Gi Kang, Changwon (KR)

(73) Assignees: INDUSTRY-ACADEMIC COOPERATION FOUNDATION, YONSEI UNIVERSITY, Seoul (KR); Hanwha Techwin Co., Ltd., Changwon-si (KR)

( * ) Notice: Subject to any disclaimer, the term of this patent is extended or adjusted under 35 U.S.C. 154(b) by 236 days.

(21) Appl. No.: 13/860,124

(22) Filed: Apr. 10, 2013

(65) Prior Publication Data

US 2013/0329101 A1 Dec. 12, 2013

(30) Foreign Application Priority Data

Jun. 7, 2012 (KR) .................. 10-2012-0061079

(51) Int. Cl.
*H04N 9/04* (2006.01)
*H04N 5/232* (2006.01)
*H04N 5/33* (2006.01)

(52) U.S. Cl.
CPC ........... *H04N 9/045* (2013.01); *H04N 5/23229* (2013.01); *H04N 5/332* (2013.01)

(58) Field of Classification Search
CPC ... H04N 5/23229; H04N 5/243; H04N 5/265; H04N 5/268; H04N 5/33; H04N 5/332; H04N 9/045
See application file for complete search history.

(56) References Cited

U.S. PATENT DOCUMENTS

| | | | |
|---|---|---|---|
| 6,211,521 B1 | 4/2001 | Bawolek et al. | |
| 2006/0177129 A1 | 8/2006 | Matsuyama | |
| 2006/0188155 A1 | 8/2006 | Matsuyama | |
| 2007/0153335 A1* | 7/2007 | Hosaka | 358/463 |
| 2008/0111894 A1* | 5/2008 | Tanimoto | 348/222.1 |
| 2008/0283728 A1 | 11/2008 | Inoue | |
| 2009/0285476 A1 | 11/2009 | Choe et al. | |

(Continued)

FOREIGN PATENT DOCUMENTS

| | | |
|---|---|---|
| CN | 101308860 A | 11/2008 |
| CN | 102369721 A | 3/2012 |

(Continued)

OTHER PUBLICATIONS

Preliminary Amendment filed May 10, 2012 for U.S. Appl. No. 13/455,654 with missing equations for PGPUB 2012/0287286 to Nomura.*

(Continued)

*Primary Examiner* — Daniel M Pasiewicz
(74) *Attorney, Agent, or Firm* — Sughrue Mion, PLLC

(57) ABSTRACT

A camera system with a multi-spectral filter array and an image processing method thereof are disclosed. The method of processing an image that is output from an image sensor including a multi-spectral filter array including a color filter and a near infrared (NIR) filter includes interpolating an NIR channel of the image by using spatial information of color channels including a red channel, a green channel, and a blue channel; and interpolating the color channels of the image by using spatial information of the NIR channel.

16 Claims, 5 Drawing Sheets

(56) References Cited

U.S. PATENT DOCUMENTS

| 2010/0295947 | A1 |  | 11/2010 | Boulanger |
| 2011/0069189 | A1 | * | 3/2011 | Venkataraman et al. .. 348/218.1 |
| 2011/0134293 | A1 | * | 6/2011 | Tanaka .......................... 348/280 |
| 2012/0287286 | A1 | * | 11/2012 | Nomura ......................... 348/162 |
| 2014/0153823 | A1 | * | 6/2014 | Lee et al. ...................... 382/167 |

FOREIGN PATENT DOCUMENTS

| JP | 2005-6066 A | 1/2005 |
| JP | 2006-217441 A | 8/2006 |
| KR | 10-2006-0093658 A | 8/2006 |
| KR | 10-2009-0120159 A | 11/2009 |
| WO | 2010/104551 A1 | 9/2010 |

OTHER PUBLICATIONS

Communication issued Feb. 3, 2016, issued by the State Intellectual Property Office of the People's Republic of China in counterpart Chinese Patent Application No. 201380030074.3.

\* cited by examiner

CAMERA SYSTEM WITH MULTI-SPECTRAL FILTER ARRAY AND IMAGE PROCESSING METHOD THEREOF

CROSS-REFERENCE TO RELATED PATENT APPLICATION

This application claims the benefit of Korean Patent Application No. 10-2012-0061079, filed on Jun. 7, 2012, in the Korean Intellectual Property Office, the disclosure of which is incorporated herein in its entirety by reference.

BACKGROUND

1. Field

The present disclosure relates to a camera system with a multi-spectral filter array and an image processing method thereof.

2. Description of the Related Art

Various methods are used to increase the image sensitivity of a digital camera such as a closed circuit television (CCTV) or the like. As the most general method, an RGB sensor and an infrared cutoff filter (IRCF) are used. In this method, when there is a large amount of light in the daytime, the IRCF and the RGB sensor are used to prevent spill light from being incident on the RGB sensor and to increase the quality of an image. In addition, when there is a small amount of light present, such as during the nighttime, the IRCF is not used, and a black and white image is output to maximize the amount of light incident on the RGB sensor, thereby increasing the amount of information of an image. However, the IRCF increases manufacturing costs of a color image detecting apparatus.

As another method of increasing image sensitivity, a near infrared (NIR) sensor and an RGB sensor are used without an IRCF. In the RGB sensor and the NIR sensor, color filters are installed on pixels corresponding to R, G, and B and a color filter is not installed on a pixel corresponding to NIR, thereby increasing the sensitivity of the sensors.

SUMMARY

The present disclosure provides a method of interpolating a high-resolution channel in consideration of a correlation between a color channel and a near infrared (NIR) channel in a camera system without a separate infrared cutoff filter (IRCF).

The present disclosure also provides a method of providing an image for identifying an object regardless of whether the image is obtained during daytime or nighttime in a camera system including a color filter and an NIR filter.

According to an aspect of an exemplary embodiment, there is provided a method of processing an image that is output from an image sensor including a multi-spectral filter array including a color filter and a near infrared (NIR) filter, the method including interpolating an NIR channel of the image by using spatial information of color channels including a red channel, a green channel, and a blue channel; and interpolating the color channels of the image by using spatial information of the NIR channel.

The method may further include restoring colors of the interpolated color channels by using brightness information of the interpolated NIR channel.

The method may further include fusing a color image including the restored color channels and an NIR image including the interpolated NIR channel.

According to another aspect of an exemplary embodiment, there is provided a camera system with a multi-spectral filter array, the camera system including an image sensor including a multi-spectral filter array including a color filter and a near infrared (NIR) filter; an NIR channel interpolator which interpolates an NIR channel of an image output from the image sensor by using spatial information of color channels including a red channel, a green channel, and a blue channel; and a color channel interpolator which interpolates each of the color channels of the image by using spatial information of the NIR channel.

The NIR channel interpolator may include a first analyzer which analyzes a tendency of a change in color channel values between adjacent color pixels and a tendency of a change in an NIR channel value between adjacent NIR pixels with respect to an interpolation value that is one of the color pixels; and a first interpolator which determines the NIR channel value of the interpolation value based on the tendency of the change in the color channel values and the tendency of the change in the NIR channel value.

The NIR channel interpolator may include a second interpolator which corrects noise properties and local properties of the interpolated NIR channel, based on noise properties and local properties which constitute edge information of a pixel of the image.

The color channel interpolator may include a second analyzer which analyzes a tendency of a change in color channel values between adjacent color pixels and a tendency of a change in an NIR channel value between adjacent NIR pixels with respect to an interpolation pixel that is one of the NIR pixels and color pixels of a color channel other than a color channel that is subject to interpolation; and a third interpolator which determines a color channel value of the interpolation pixel, based on the tendency of the change in the color channel values and the tendency of the change in the NIR channel value and which performs initial interpolation.

The color channel interpolator may further include a fourth interpolator which updates edge information and detail information of the color channel on which the initial interpolating is performed, by using edge information and detail information of the interpolated NIR channel.

The camera system may further include a color restorer which restores colors of the interpolated color channels by using brightness information of the interpolated NIR channel.

The color restorer may include a third interpolator which analyzes a correlation between colors of the interpolated color channels and brightness of the interpolated NIR channel; a channel weight calculator which determines a weight for each respective color channel, based on the correlation; and a subtractor which removes an NIR component included in each of the color channels, by using the weight, to generate restored color channels.

The restoring of the colors may be performed on a pixel-by-pixel basis.

The camera system may further include an image fuser which fuses a color image including the restored color channels and an NIR image including the interpolated NIR channel.

The image fuser may include an image weight calculator which determines a weight based on an edge component and a detail component of each of the color image and the NIR image; and a fuser which applies the weight to the color image and the NIR image and fuses the color image and the NIR image.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION OF THE EXEMPLARY EMBODIMENTS

Figures 1, 2, 3:
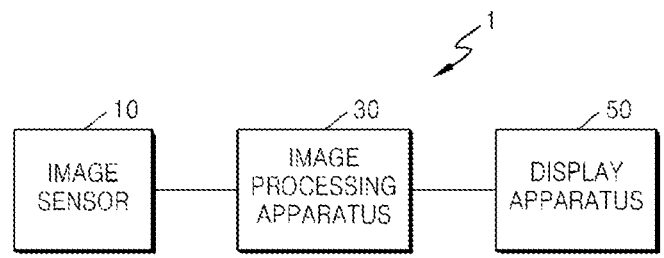
FIG. 1 is a block diagram of a camera system according to an exemplary embodiment.
FIGS. 2 and 3 are schematic diagrams of an image sensor shown in FIG. 1, according to an exemplary embodiment.

Hereinafter, the present disclosure will be described in detail by explaining exemplary embodiments with reference to the attached drawings. Like reference numerals in the drawings denote like elements. In the description of the present disclosure, certain detailed explanations of related art are omitted when it is deemed that they may unnecessarily obscure the essence of the exemplary embodiments.

The terms such as "first" and "second" are used herein merely to describe a variety of constituent elements, but the constituent elements are not limited by the terms. The terms are used only for the purpose of distinguishing one constituent element from another constituent element.

The terms used in the present disclosure are used for explaining a specific exemplary embodiment, and do not limit the present disclosure. Thus, the expression of a term in the singular in the present disclosure includes the expression of the same term in plural, unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a camera system 1 according to an exemplary embodiment. FIGS. 2 and 3 are schematic diagrams of an image sensor 10 shown in FIG. 1, according to an exemplary embodiment.

Referring to FIG. 1, the camera system 1 includes the image sensor 10, an image processing apparatus 30, and a display apparatus 50. The camera system 1 may be an image photographing system such as a digital camera, a camcorder, or a surveillance camera or may be mounted on a computer, a personal digital assistant (PDA), a portable multimedia player (PMP), a mobile phone, or the like.

The image sensor 10 uses a photoelectric conversion device such as a charge-coupled device (CCD), a complementary metal oxide semiconductor (CMOS), or the like. As shown in FIG. 2, the image sensor 10 includes a pixel array in which a plurality of pixels is formed, in which an optical signal is converted into an electrical image signal by the photoelectric conversion device. A multi-spectral filter array (MFA) for passing visible band light and invisible band light is disposed on the image sensor 10. The MFA includes a color filter for passing a light component having a particular color, such as Red, Green, or Blue (RGB) in visible band light, and a near infrared (NIR) filter for passing a light component of a near infrared (NIR) region in invisible band light. As shown in FIG. 3, color filters RCF, GCF, and BCF and a near infrared filter NIRF of the MFA are disposed to respectively correspond to pixels of the image sensor 10 such that the pixels of the image sensor 10 may detect color channel signals R, G, and B and a near infrared signal NIR which are transmitted through the MFA.

A lens (not shown) for receiving an optical signal may be disposed in front of the image sensor 10.

The image processing apparatus 30 outputs a single image by using all information input to the color filters RCF, GCF, and BCF and the near infrared filter NIRF of the image sensor including the MFA.

Figure 10:
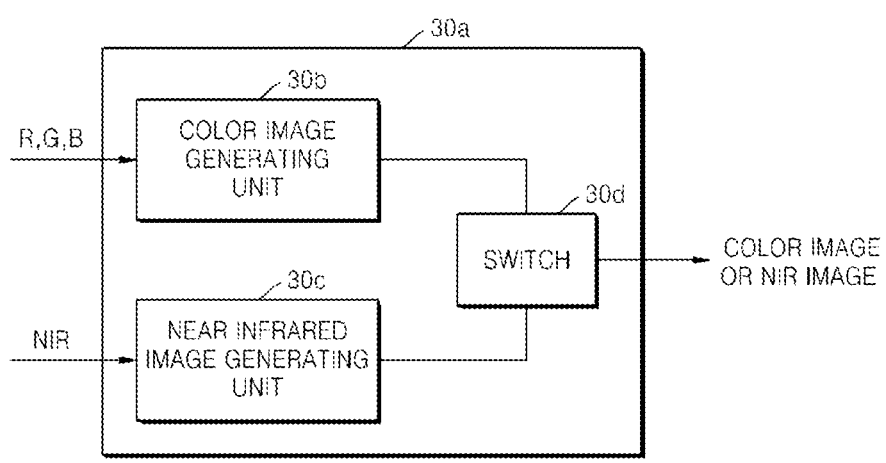
FIG. 10 shows a conventional image processing apparatus using an image sensor including RGB color filters and a near infrared (NIR) filter.

FIG. 10 shows a conventional image processing apparatus using an image sensor including RGB color filters and a near infrared (NIR) filter. Referring to FIG. 10, a switch 30d increases image sensitivity by outputting an RGB color image generated by a color image generating unit 30b in a daytime mode and by outputting a black and white image (NIR image) generated by a near infrared image generating unit 30c in a nighttime mode. However, in the daytime mode, the resolution of an RGB channel is reduced due to an NIR component even though the RGB channel does not use NIR channel information. In addition, the image sensor uses NIR channel information only in the nighttime mode. Thus, since the image sensor includes a pixel array of R, G, B, and NIR units, actual resolution of the NIR channel is reduced to ¼ an original resolution in the nighttime mode, and the amount of obtained information is reduced.

However, according to an exemplary embodiment, the image processing apparatus 30 uses spatial information of an NIR image when generating an RGB color image and uses spatial information of an RGB color image when generating an NIR image. In both the daytime and nighttime, the image processing apparatus 30 generates a fusion image including both color information and NIR information, which is obtained by fusing a color image and an NIR image. Thus, both the frequency properties of an image input to RGB pixels and the frequency properties of an image input to NIR pixels are used to output an optimum image.

The display apparatus 50 outputs the fusion image obtained by fusing a color image and an NIR image. The display apparatus 50 may be integrated with the image processing apparatus 30 and may be included in the camera system 1. Alternatively, the display apparatus 50 may be implemented as an independent apparatus which is connected to the image processing apparatus 30 via a wired or wireless method.

Figure 4:
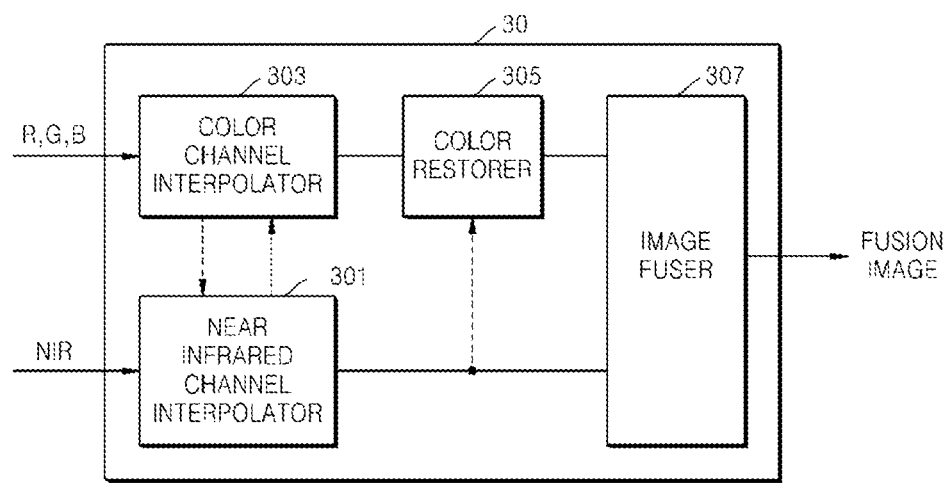
FIG. 4 is a schematic block diagram of an image processing apparatus according to an exemplary embodiment.

FIG. 4 is a schematic block diagram of the image processing apparatus 30 according to an exemplary embodiment.

Referring to FIG. 4, the image processing apparatus 30 includes a near infrared channel interpolator 301, a color channel interpolator 303, a color restorer 305, and an image fuser 307.

According to an exemplary embodiment, each pixel of the image sensor 10 has (obtains) only a single piece of information from among various pieces of information of various channels. That is, an R pixel has R color information only, a G pixel has G color information only, a B pixel has B color information only, and an NIR pixel has NIR information only. Thus, according to an exemplary embodiment, the image processing apparatus 30 estimates or interpolates information of another channel, which is not stored in each pixel, based on information of adjacent pixels. That is, R, G, and B channel values and an NIR channel value are obtained from all of the pixels. To this end, the image processing apparatus 30 separates R, G, and B color channels and an NIR channel from each other in an original image input to the image processing apparatus 30 from the image sensor 10 and processes the R, G, and B color channels and the NIR channel.

The near infrared channel interpolator 301 obtains an NIR image of high resolution in consideration of a correlation between the NIR channel and RGB channels adjacent to the NIR channel. The near infrared channel interpolator 301 performs up-scaling of the NIR image in consideration of the RGB channels. In addition, simultaneously with or subsequent to the up-scaling, the near infrared channel interpolator 301 recognizes the noise properties and local properties of an original image due to a filter arrangement and generates an NIR image having an optimum high resolution.

The color channel interpolator 303 interpolates each of the RGB channels to have the same size as the NIR channel by using NIR channel information of which resolution is increased by interpolating the NIR channel. To this end, the color channel interpolator 303 performs initial interpolation of each of the RGB channels and then updates edge information and detail information of the RGB channels in consideration of a correlation with the interpolated NIR channel.

The color restorer 305 restores colors of the RGB channels by using the NIR channel information in the RGB channels and the NIR channel, of which resolutions are increased by interpolating the RGB channels and the NIR channel. Since NIR band information and visible band information, which are obtained by using the image sensor 10, are mixed together in the RGB channels, the color restorer 305 restores color information by separating the NIR band information and the visible band information from each other. The color restorer 305 may set weights for respective channels in consideration of a correlation between brightness of the NIR channel and colors of the RGB channel with which the NIR information is mixed and may remove the NIR information from the RGB channels according to the weights to exhibit natural color.

The image fuser 307 fuses the RGB color image on which color restoration is performed and the NIR image of which resolution is increased by interpolation to obtain a single image. The image fuser 307 determines image weights in consideration of edge components and detail components of two images and fuses the two images by applying the image weights to output a final image including both the RGB color channel information and the NIR channel information. Since the final image contains the NIR information while the color of the RGB image is maintained, the final image may include a greater amount of information compared with the RGB image.

Figure 5:
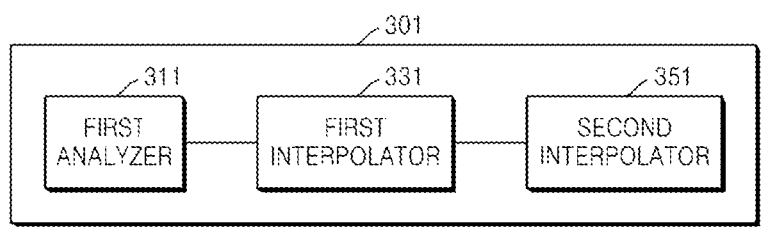
FIG. 5 is a block diagram of a near infrared channel interpolator according to an exemplary embodiment.

FIG. 5 is a block diagram of a near infrared channel interpolator 301 according to an exemplary embodiment.

The near infrared channel interpolator 301 interpolates the NIR channel of an original image output from the image sensor 10 by using spatial information of each of the R, G, and B color channels. The near infrared channel interpolator 301 includes a first analyzer 311, a first interpolator 331, and a second interpolator 351.

The first analyzer 311 analyzes a tendency of a change in RGB color channel values between adjacent RGB color pixels and a tendency of a change in an NIR channel value between adjacent NIR pixels with respect to each interpolation pixel of the NIR channel. In this case, the interpolation pixels are pixels to be currently processed and may be color pixels other than the NIR pixel, for example, an R pixel, a G pixel, and a B pixel. The first analyzer 311 analyzes a tendency of a change in an R channel value between R pixels, a tendency of a change in a G channel value between G pixels, a tendency of a change in a B channel value between B pixels, and a tendency of a change in an NIR channel value between NIR pixels within an M×N (where M and N are each a natural number) mask with respect to the R pixel, the G pixel, and the B pixel that are the interpolating pixels. Thus, spatial information such as an edge position, an edge direction, smoothness, or the like may be recognized in each color channel. Accordingly, the first analyzer 311 may obtain a correlation between the RGB channels and the NIR channel in the interpolation pixel, based on a tendency of a change in an R channel value, a tendency of a change in a G channel value, a tendency of a change in a B channel value, and a tendency of a change in an NIR channel value.

The first interpolator 331 determines an NIR channel value of the interpolation pixel based on the obtained correlations and performs initial interpolation. Accordingly, the R pixel, the G pixel, and the B pixel have respective NIR channel values and the NIR channel is up-scaled to increase the resolution of the NIR channel.

The second interpolator 351 corrects the noise properties and local properties of the NIR channel on which initial interpolation is performed, based on the noise properties and local properties of the original image output from the image sensor 10. Thus, the NIR channel values of respective pixels may be optimized.

The original image passed through a filter of each pixel may deteriorate due to the arrangement of filters of the image sensor 10 and noise based on the properties of the image sensor 10. Thus, according to an exemplary embodiment, noise contained in the NIR channel on which initial interpolation is performed is removed in consideration of noise added to the original image. The method of removing noise according to exemplary embodiments is not limited to any one particular method. Thus, various well-known methods, such as an adaptive weighting average method, a local linear minimum mean square error (LLMMSE) method, or the like may be used.

The term "local properties" refers to properties about edge information of each pixel. For example, each pixel may be classified into a flat region, an edge region, and a detail region. The flat region corresponds to a case where a current pixel has similar properties to adjacent pixels. The edge region and the detail region correspond to a case where a current pixel and adjacent pixels have different properties. The edge region is defined as, for example, an outline or boundary of an object or the like. The detail region is defined as, for example, a pattern of an object, such as a plaid pattern of clothes, a leaf pattern, a pattern of a necktie, or the like. A color error may occur due to inappropriate edge information. Thus, according to an exemplary embodiment, edge information of the NIR channel on which initial interpolation is performed is corrected in consideration of edge information of the original image.

Figure 6:
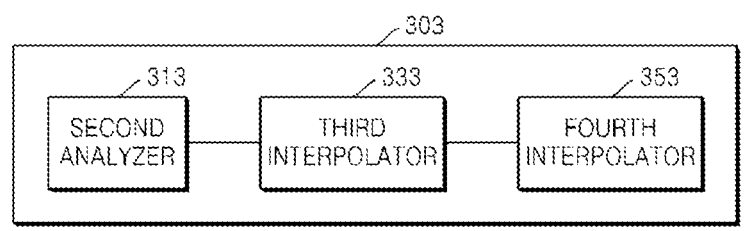
FIG. 6 is a block diagram of a color channel interpolator according to an exemplary embodiment.

FIG. 6 is a block diagram of a color channel interpolator 303 according to an exemplary embodiment.

Referring to FIG. 6, the color channel interpolator 303 interpolates each of the RGB color channels of the original image by using spatial information of the interpolated NIR channel. In this case, the interpolated NIR channel is an NIR channel of which resolution is increased by performing initial interpolation and correction. The color channel interpolator 303 includes a second analyzer 313, a third interpolator 333, and a fourth interpolator 353.

The second analyzer 313 analyzes a tendency of a change in RGB color channel values between adjacent color pixels and a tendency of a change in an NIR channel value between adjacent NIR pixels in each interpolation pixel of the RGB channels. In this case, the interpolation pixels are pixels in a channel other than an interpolation channel. That is, with regard to R channel interpolation, interpolation pixels are a G pixel, a B pixel, and an NIR pixel. With regard to G channel interpolation, interpolation pixels are an R pixel, a B pixel, and an NIR pixel. With regard to B channel interpolation, interpolation pixels are an R pixel, a G pixel, and an NIR pixel. The second analyzer 313 analyzes a tendency of a change in an R channel value between R pixels, a tendency of a change in a G channel value between G pixels, a tendency of a change in a B channel value between B pixels, and a tendency of a change in an NIR channel value between NIR pixels within an M×N (where M and N are each a natural number) mask with respect to the R pixel, the G pixel, the B pixel, and the NIR pixel that are the interpolating pixels for respective RGB color channels. In this case, the tendency of a change in an NIR channel value is analyzed with respect to the interpolated NIR channel. Thus, spatial information such as an edge position, an edge direction, smoothness, or the like may be recognized. Accordingly, the second analyzer 313 may obtain a correlation between the RGB channels and the NIR channel in the interpolation pixel, based on a tendency of a change in an R channel value, a tendency of a change in a G channel value, a tendency of a change in a B channel value, and a tendency of a change in an NIR channel value. That is, with regard to R channel interpolation, a correlation between an R channel and G, B, and NIR channels may be obtained. With regard to G channel interpolation, a correlation between the G channel and R, B, and NIR channels may be obtained. With regard to B channel interpolation, a correlation between the B channel and R, G, and NIR channels may be obtained.

The third interpolator 333 determines RGB color channel values of interpolation pixels based on the obtained correlations and performs initial interpolation. Thus, the R channel is interpolated by determining the R channel value in the G, B, and NIR pixels, the G channel is interpolated by determining the G channel value in the R, B, and NIR pixels, and the B channel is interpolated by determining the B channel value in the R, G, and NIR pixels. That is, the R pixel may have the G and B channel values, the G pixel may have the R and B channel values, and the B pixel may have the R and G channel values, thereby increasing the resolution of the RGB channels.

The fourth interpolator 353 updates edge information and detail information of the RGB color channels on which initial interpolation is performed by using edge information and detail information of the interpolated NIR channel. Thus, the RGB color channel values of respective pixels may be optimized.

According to an exemplary embodiment, an interpolation order of the RGB channels is not limited to any particular order. Thus, for example, the RGB channels may be simultaneously interpolated or may be sequentially interpolated in a predetermined order.

Figure 7:
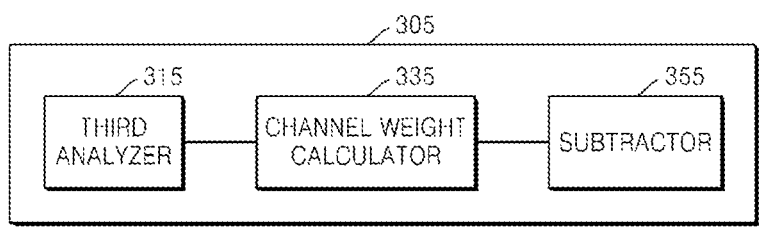
FIG. 7 is a schematic block diagram of a color restorer according to an exemplary embodiment.

FIG. 7 is a schematic block diagram of a color restorer 305 according to an exemplary embodiment.

Referring to FIG. 7, the color restorer 305 restores colors of the interpolated RGB color channels by using brightness information of the interpolated NIR channel. In this case, the interpolated RGB color channel is an RGB channel which is improved by initial interpolation and correction. The interpolated NIR channel is an NIR channel which is improved by initial interpolation and correction. The color restorer 305 includes a third analyzer 315, a channel weight calculator 335, and a subtractor 355. The color restoration may be performed on a pixel-by-pixel basis.

The third analyzer 315 obtains a correlation between color of the interpolated RGB color channels and brightness of the interpolated NIR channel.

The channel weight calculator 335 determines a weight for respective RGB color channels based on the obtained correlation. Each of the interpolated RGB color channels includes an NIR component. Conventionally, it is assumed that an NIR component included in respective RGB pixels has the same value as an NIR channel value of an NIR pixel and the NIR channel value is subtracted from each of the RGB color channels. However, photoelectric conversion devices of respective pixels may have different sensitivities with respect to near infrared rays. Thus, although photoelectric conversion devices receive the same near infrared ray, near infrared components contained in signals output from the respective photoelectric conversion devices may be different. Thus, according to an exemplary embodiment, values of the near infrared components, which are removed for respective RGB color channels, are variably set in consideration of a correlation between channels. To this end, the channel weight calculator 335 sets weights for respective RGB color channels.

The subtractor 355 removes an NIR component contained in each of the RGB color channels by using the weights for respective RGB channels. By removing an influence of infrared rays, information of the RGB color channels may become exact.

Figure 8:
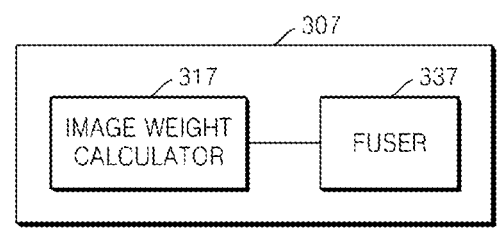
FIG. 8 is a schematic block diagram of an image fuser according to an exemplary embodiment.

FIG. 8 is a schematic block diagram of an image fuser 307 according to an exemplary embodiment.

Referring to FIG. 8, the image fuser 307 fuses a color image including restored RGB color channels and an NIR image including the interpolated NIR channel. The image fuser 307 includes an image weight calculator 317 and a fuser 337.

An image weight calculator 317 determines weights that are respectively applied to a color image and an NIR image. The weights may be determined based on edge information and detail information of the color image and NIR image.

The fuser 337 applies the weights to the color image and the NIR image and fuses the color image and the NIR image.

In an environment with a low intensity of illumination or a dark environment, such as, for example, the nighttime, an object may not be frequently recognized by using RGB color channels only. In this case, when information of the RGB color channels is reinforced by using information of the NIR channel, information which is not conventionally obtained in a visible region may be obtained, and thus, an image for identifying an object may be obtained. Thus, according to an exemplary embodiment, since a fusion image obtained by fusing a color image and an NIR image includes both RGB color channel information and NIR channel information, an image for identifying the object may also be obtained in a dark environment.

Figure 9:
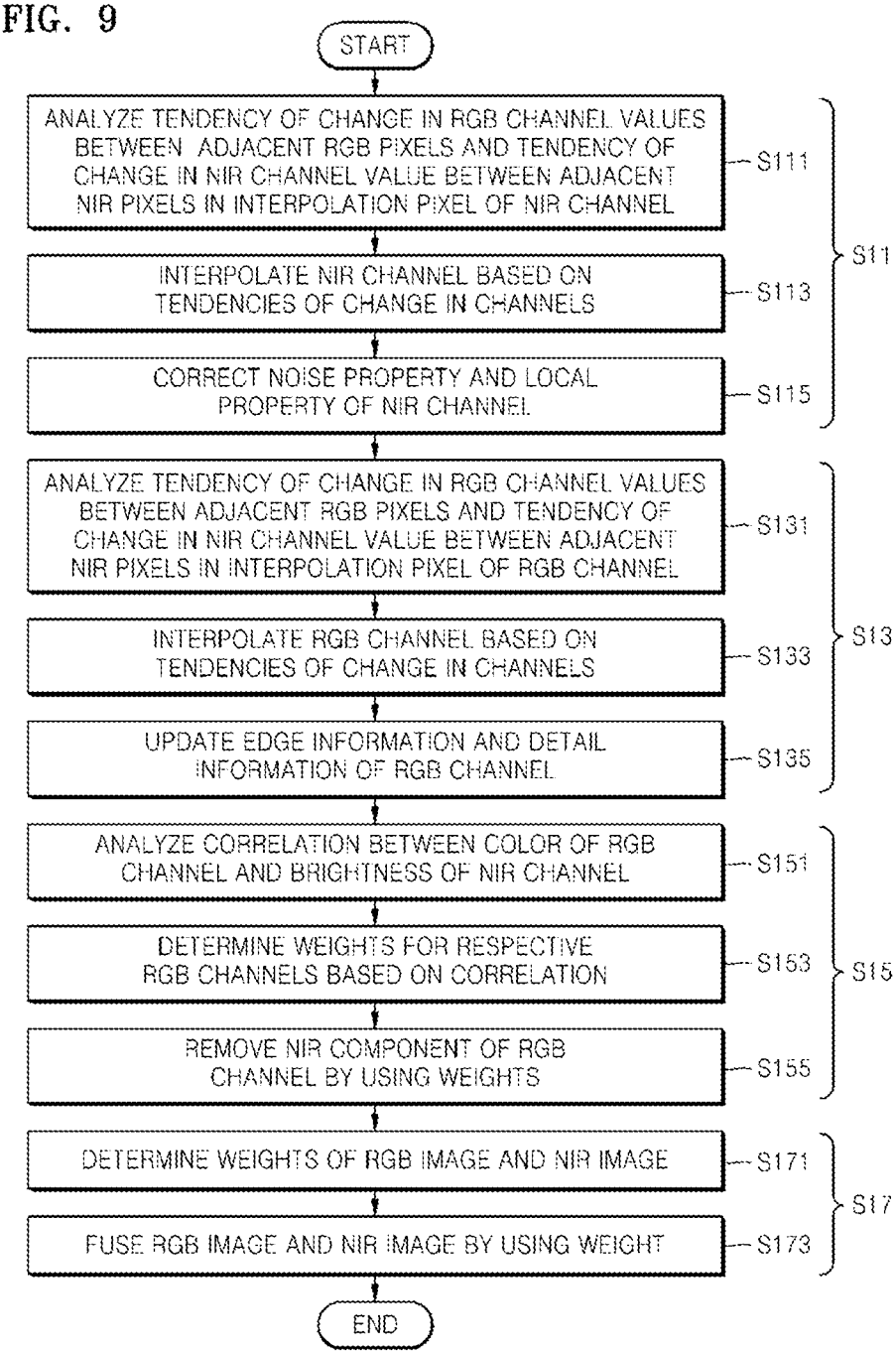
FIG. 9 is a flowchart of an image processing method based on a multi-spectral filter array (MFA), according to an exemplary embodiment.

FIG. 9 is a flowchart of an image processing method based on an MFA, according to an exemplary embodiment.

According to an exemplary embodiment, the image processing method shown in FIG. 9 may be performed by the camera system 1 shown in FIGS. 1 through 8, although is not limited thereto and may also be performed by other camera systems as well. In the image processing method according to the present exemplary embodiment, an original image output from an image sensor including the MFA having an RGB color filter and an NIR filter is interpolated for each respective channel and a fusion image obtained by fusing a color image and an NIR image is output regardless of whether the image is captured in the daytime or the nighttime. Thus, when a visual field is obstructed due to fog, smoke, and so on in the daytime, accurate information may be obtained according to NIR channel information. In addition, in the nighttime, an NIR image including RGB color information may be obtained.

A camera system separates an NIR channel and RGB color channels of an original image output from an image sensor.

The camera system interpolates the NIR channel by using spatial information of color channels including the R channel, the G channel, and the B channel at operation S11. In detail, the camera system analyzes a tendency of a change in color channel values between adjacent color pixels and a tendency of a change in an NIR channel value between adjacent NIR pixels within a mask having a predetermined size with respect to an interpolation pixel that is in the NIR channel at operation S111. The camera system obtains a correlation between the RGB color channels and the NIR channel based on the tendency of change in the RGB color values and the tendency in change in the NIR channel value and performs initial interpolation for determining an NIR value of the interpolation pixel at operation S113. Then, the camera system obtains an NIR channel of high resolution by correcting the noise properties and the local properties of the interpolated NIR channel based on the noise properties of an original image and the local properties that constitute edge information of a pixel at operation S115.

The camera system interpolates the RGB color channels by using spatial information of the NIR channel of high resolution, which is obtained by interpolation and correction, at operation S13. In detail, the camera system analyzes a tendency of change in color channel values between adjacent color pixels and a tendency of change in an NIR channel value between adjacent NIR pixels within a mask having a predetermined size with respect to an interpolation pixel that is one of the color pixels and NIR pixels of channels other than the color channels that are subject to interpolation at operation S131. In addition, the camera system obtains a correlation between a channel that is subject to interpolation and other channels based on the tendency of a change in color channels and the tendency of a change in an NIR channel and performs initial interpolation for determining RGB color channel values of the interpolation pixel at operation S133. Then, the camera system obtains RGB color channels by updating edge information and detail information of RGB color channels on which initial interpolation is performed, by using edge information and detail information of the interpolated NIR channel at operation S135.

The camera system restores colors of the RGB color channels of high resolution by using brightness information of the interpolated NIR channel of high resolution at operation S15. In detail, the camera system obtains a correlation between colors of the interpolated color channels and brightness of the interpolated NIR channel at operation S151. In addition, the camera system determines weights for respective RGB color channels based on the correlation at operation S153. Then, the camera system separates an NIR component included in each of the RGB color channels by using the weights at operation S155. Color restoration may be performed on a pixel-by-pixel basis, although is not limited thereto.

The camera system fuses a color image including the restored RGB color channels and an NIR image including the interpolated NIR channel of high resolution at operation S17. In detail, the camera system determines the weights of an image based on edge information and detail information of each of the color image and the NIR image at operation S171. In addition, the camera system applies the weights to the color image and the NIR image and fuses the color image and the NIR image at operation S173.

The fusion image is output on a display apparatus regardless of whether the fusion image is output in daytime or nighttime.

The above-described exemplary embodiments may be used in a digital camera system using a sensor having a structure including RGB and NIR pixels, and in particular, in the surveillance camera field or other fields as well.

The exemplary embodiments can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the exemplary embodiments can be easily construed by programmers skilled in the art to which the exemplary embodiments pertain.

A camera system according to the one or more exemplary embodiments may provide a clear interpolation image of high resolution in consideration of a correlation between a color channel and an NIR channel.

In addition, the camera system according to the one or more exemplary embodiments may provide a fusion image including both color information and NIR information to identify an object.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A method of processing an image that is output from an image sensor comprising a multi-spectral filter array comprising a color filter and a near infrared (NIR) filter, the method comprising:
 interpolating an NIR channel of the image by using spatial information of color channels comprising a red channel, a green channel, and a blue channel;
 interpolating the color channels of the image by using spatial information of the NIR channel;
 restoring colors of the interpolated color channels by using brightness information of the interpolated NIR channel; and fusing a color image comprising the restored colors and an NIR image comprising the interpolated NIR channel.

2. A method of claim 1,
wherein the interpolating the NIR channel comprises analyzing a tendency of a change in a value of the red channel between red color pixels, a tendency of a change in a value of the green channel between green color pixels, a tendency of a change in a value of the blue channel between blue color pixels, and a tendency of a change in an NIR channel value between adjacent NIR pixels with respect to an interpolation pixel that is one of the color pixels.

3. The method of claim 2, wherein the interpolating the NIR channel further comprises:
performing a first interpolating operation comprising determining the NIR channel value of the interpolation pixel based on the tendency of the change in the red, green, and blue channel values and the tendency of the change in the NIR channel value; and
performing a second interpolating operation comprising correcting noise properties and local properties of the interpolated NIR channel, based on noise properties and local properties which constitute edge information of a pixel of the image.

4. The method of claim 2, wherein the interpolating the color channels comprises:
analyzing a tendency of a change in color channel values between adjacent color pixels and a tendency of a change in an NIR channel value between adjacent NIR pixels with respect to an interpolation pixel that is one of the NIR pixels and color pixels of a color channel other than a color channel that is subject to interpolation; and
performing a first interpolating operation comprising determining a color channel value of the interpolation pixel, based on the tendency of the change in the color channel values and the tendency of the change in the NIR channel value.

5. The method of claim 4, wherein the interpolating the color channels further comprises:
performing a second interpolating operation comprising updating edge information and detail information of the color channel on which the first interpolating is performed, by using edge information and detail information of the interpolated NIR channel.

6. The method of claim 1, wherein the restoring of the colors comprises:
analyzing a correlation between colors of the interpolated color channels and brightness of the interpolated NIR channel;
determining a weight for each respective one of the color channels, based on the correlation; and
removing an NIR component included in each of the color channels, by using the weight, to generate the restored colors.

7. The method of claim 1, wherein the restoring of the colors is performed on a pixel-by-pixel basis.

8. The method of claim 1, wherein the fusing comprises:
determining a weight based on an edge component and a detail component of each of the color image and the NIR image; and
applying the weight to the color image and the NIR image and fusing the color image and the NIR image.

9. A camera system with a multi-spectral filter array, the camera system comprising:
an image sensor comprising a multi-spectral filter array comprising a color filter and a near infrared (NIR) filter;
an NIR channel interpolator configured to interpolate an NIR channel of an image output from the image sensor by using spatial information of color channels comprising a red channel, a green channel, and a blue channel;
a color channel interpolator configured to interpolate the color channels of the image by using spatial information of the NIR channel;
a color restorer configured to restore colors of the interpolated color channels by using brightness information of the interpolated NIR channel; and
an image fuser configured to fuse a color image comprising the restored colors and an NIR image comprising the interpolated NIR channel.

10. The camera system of claim 9,
wherein the NIR channel interpolator comprises a first analyzer configured to analyze a tendency of a change in a value of the red channel between red color pixels, a tendency of a change in a value of the green channel between green color pixels, a tendency of a change in a value of the blue channel between blue color pixels, and a tendency of a change in an NIR channel value between adjacent NIR pixels with respect to an interpolation pixel that is one of the color pixels.

11. The camera system of claim 10, wherein the NIR channel interpolator further comprises a first interpolator which determines the NIR channel value of the interpolation pixel based on the tendency of the changes in the red, green, and blue channel values and the tendency of the change in the NIR channel value, and a second interpolator configured to correct noise properties and local properties of the interpolated NIR channel, based on noise properties and local properties which constitute edge information of a pixel of the image.

12. The camera system of claim 10, wherein the color channel interpolator comprises:
a second analyzer configured to analyze a tendency of a change in color channel values between adjacent color pixels and a tendency of a change in an NIR channel value between adjacent NIR pixels with respect to an interpolation pixel that is one of the NIR pixels and color pixels of a color channel other than a color channel that is subject to interpolation; and
a third interpolator configured to determine a color channel value of the interpolation pixel, based on the tendency of the change in the color channel values and the tendency of the change in the NIR channel value and which performs an initial interpolation.

13. The camera system of claim 12, wherein the color channel interpolator further comprises a fourth interpolator configured to update edge information and detail information of the color channel on which the initial interpolating is performed, by using edge information and detail information of the interpolated NIR channel.

14. The camera system of claim 9, wherein the color restorer comprises:
a third interpolator configured to analyze a correlation between colors of the interpolated color channels and brightness of the interpolated NIR channel;
a channel weight calculator configured to determine a weight for each respective color channel, based on the correlation; and
a subtractor configured to remove an NIR component included in each of the color channels, by using the weight, to generate the restored colors.

15. The camera system of claim 9, wherein the restoring of the colors is performed on a pixel-by-pixel basis.

16. The camera system of claim 9, wherein the image fuser comprises:

an image weight calculator configured to determine a weight based on an edge component and a detail component of each of the color image and the NIR image; and a fuser configured to apply the weight to the color image and the NIR image and fuses the color image and the NIR image.

* * * * *